US009895937B2

(12) United States Patent
Bondu

(10) Patent No.: US 9,895,937 B2
(45) Date of Patent: *Feb. 20, 2018

(54) HEAVY VEHICLE TIRE WITH SPECIFIED CARCASS TURN-UP, BEAD PROTECTION ELEMENT, BEAD FILLER ELEMENT, AND BEAD TRANSITION ELEMENT

(75) Inventor: Lucien Bondu, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 884 days.

This patent is subject to a terminal disclaimer.

(21) Appl. No.: 14/123,924

(22) PCT Filed: Jun. 6, 2012

(86) PCT No.: PCT/EP2012/060648
§ 371 (c)(1),
(2), (4) Date: Apr. 22, 2014

(87) PCT Pub. No.: WO2012/168271
PCT Pub. Date: Dec. 13, 2012

(65) Prior Publication Data
US 2014/0224403 A1    Aug. 14, 2014

(30) Foreign Application Priority Data
Jun. 7, 2011  (FR) ..................... 11 54930

(51) Int. Cl.
*B60C 15/06*  (2006.01)
*B60C 15/00*  (2006.01)
*B60C 9/02*  (2006.01)

(52) U.S. Cl.
CPC .......... *B60C 15/06* (2013.01); *B60C 15/0063* (2013.01); *B60C 15/0603* (2013.01);
(Continued)

(58) Field of Classification Search
CPC ............ B60C 15/0063; B60C 15/0607; B60C 15/0603; B60C 15/06; B60C 1/0041;
(Continued)

(56) References Cited

U.S. PATENT DOCUMENTS 4,227,563 A * 10/1980 Grosch ............... B60C 15/0607
152/541 X
6,622,765 B1  9/2003 Corsi
(Continued)

FOREIGN PATENT DOCUMENTS

EP    1350639 A1    10/2003
FR    2776238 A1    9/1999
(Continued)

OTHER PUBLICATIONS

English machine translation of JP 10-76822 A, Mar. 24, 1998.*
PCT/EP2012/060648—International Search Report (English translation included), dated Aug. 10, 2012, 2 pages.

*Primary Examiner* — Adrienne C Johnstone
(74) *Attorney, Agent, or Firm* — Dickinson Wright PLLC

(57) ABSTRACT

The invention relates to improving the endurance of the beads of a radial tire for a heavy vehicle of construction plant type by reducing the cracking that starts on the axially outer face of the turn-up and spreads through the polymer coating and filler materials. According to the invention, a transition element made of a polymer transition material, is in contact, via its axially inner face, with the polymer coating material of the axially outer face of the turn-up and, via its axially outer face, with the polymer filler material, and the elastic modulus at 10% elongation of the polymer transition material is somewhere between the respective
(Continued)

elastic moduluses at 10% elongation of the polymer coating material and of the polymer filler material.

8 Claims, 2 Drawing Sheets

(52) U.S. Cl.
CPC .. *B60C 15/0607* (2013.01); *B60C 2009/0276* (2013.01); *B60C 2015/061* (2013.01); *B60C 2015/0614* (2013.01); *B60C 2015/0621* (2013.01); *B60C 2200/065* (2013.01); *Y10T 152/10828* (2015.01); *Y10T 152/10846* (2015.01)

(58) Field of Classification Search
CPC .... B60C 2015/0614; B60C 2015/0617; B60C 2015/0621; B60C 2009/0276; Y10T 152/10828; Y10T 152/10846
USPC .......... 152/541, 543, 547, 552, 564
See application file for complete search history.

(56) References Cited

U.S. PATENT DOCUMENTS

| | | | |
|---|---|---|---|
| 6,962,183 B2 * | 11/2005 | Ueyoko | B60C 15/0607 152/541 X |
| 2004/0007305 A1 | 1/2004 | Ueyoko | |
| 2004/0123927 A1 | 7/2004 | Ueyoko et al. | |
| 2010/0252164 A1 | 10/2010 | Oogane | |
| 2012/0267028 A1 * | 10/2012 | Laurent | B60C 15/0607 152/547 |

FOREIGN PATENT DOCUMENTS

| | | | |
|---|---|---|---|
| JP | 10076822 A | * | 3/1998 |
| JP | 2004345414 A | | 12/2004 |
| JP | 2009/113715 A | | 5/2009 |
| WO | 2002/085647 A1 | | 10/2002 |
| WO | WO-2011/057889 A1 | * | 5/2011 |

* cited by examiner

HEAVY VEHICLE TIRE WITH SPECIFIED CARCASS TURN-UP, BEAD PROTECTION ELEMENT, BEAD FILLER ELEMENT, AND BEAD TRANSITION ELEMENT

This application is a national stage application of PCT/EP2012/060648, filed Jun. 6, 2012, which claims the benefit of FR 1154930, filed Jun. 7, 2011.

BACKGROUND

1. Field

The present invention relates to a radial tire intended to be fitted to a heavy vehicle of construction plant type.

2. Description of Related

Although not restricted to this type of application, the invention will be more particularly described with reference to a radial tire intended to be mounted on a dumper, a vehicle for transporting materials extracted from quarries or open cast mines. The nominal diameter of the rim of such a tire, within the meaning of the European Tire and Rim Technical Organisation (ETRTO) standard, is a minimum of 25".

The following definitions apply in what follows:

"Meridian plane": a plane containing the axis of rotation of the tire.

"Equatorial plane": the plane passing through the middle of the tire tread surface and perpendicular to the axis of rotation of the tire.

"Radial direction": a direction perpendicular to the axis of rotation of the tire.

"Axial direction": a direction parallel to the axis of rotation of the tire.

"Circumferential direction": a direction perpendicular to a meridian plane.

"Radial distance": a distance measured perpendicular to the axis of rotation of the tire and from the axis of rotation of the tire.

"Axial distance": a distance measured parallel to the axis of rotation of the tire and from the equatorial plane.

"Radially": in a radial direction.

"Axially": in an axial direction.

"Radially on the inside, or respectively radially on the outside": which is situated at a smaller or greater radial distance, respectively.

"Axially on the inside, or respectively axially on the outside": which is situated at a smaller or greater axial distance, respectively.

A tire comprises two beads which provide the mechanical connection between the tire and the rim on which it is mounted, the beads being joined respectively by two sidewalls to a tread intended to come into contact with the ground via a tread surface.

A radial tire more particularly comprises a reinforcement, comprising a crown reinforcement radially on the inside of the tread, and a carcass reinforcement radially on the inside of the crown reinforcement.

The carcass reinforcement of a radial tire for a heavy vehicle of construction plant type usually comprises at least one carcass reinforcement layer made up of metallic reinforcing elements coated in a polymer coating material. The metallic reinforcing elements are substantially parallel to one another and make an angle of between 85° et 95° with the circumferential direction. The carcass reinforcement layer comprises a main part, joining the two beads together and wrapped, within each bead, around a bead wire. The bead wire comprises a circumferential reinforcing element, usually made of metal, surrounded by at least one material, which, and this list is not exhaustive, may be made of polymer or textile. The carcass reinforcement layer is wrapped around the bead wire from the inside towards the outside of the tire to form a turn-up having an end. The turn-up, within each bead, allows the carcass reinforcement layer to be anchored to the bead wire of that bead.

Each bead comprises a filling element which extends the bead wire radially outwards. The filling element is made of at least one polymer filling material. The filling element may be made of a radial stack of at least two polymer filling materials which are in contact along a contact surface that intersects any meridian plane along a meridian line. The filling element axially separates the main part from the turn-up.

Each bead also comprises a protection element extending the sidewall radially towards the inside and which is axially on the outside of the turn-up. The protection element is also at least partially in contact via its axially outer face with the flange of the rim. The protection element is made of at least one polymer protection material.

Each bead finally comprises a filler element axially on the inside of the sidewall and of the protection element and axially on the outside of the turn-up. The filler element is made of at least one polymer filler material.

A polymer material, after curing, is mechanically characterized by tensile stress-deformation characteristics which are determined by tensile testing. This tensile testing is carried out by a person skilled in the art, on a test specimen, according to a known method, for example in accordance with International Standard ISO 37, and under standard temperature (23+ or −2° C.) and moisture (50+ or −5% relative humidity) conditions defined by International Standard ISO 471. For a polymer material, the elastic modulus at 10% elongation, expressed in mega pascals (MPa), is the tensile stress measured for a 10% elongation of the test specimen.

A polymer material, after curing, is also mechanically characterized by its hardness. The hardness is notably defined by the Shore A hardness determined in accordance with standard ASTM D 2240-86.

When the vehicle is being driven along, the tire, mounted on its rim, inflated and compressed under the load of the vehicle, is subjected to bending cycles, particularly in its beads and its sidewalls.

The bending cycles lead to variations in curvature which are combined with variations in the tension of the metallic reinforcing elements of the main part and of the turn-up.

Considering that a bead behaves mechanically in bending like a beam the respectively outer and inner axes of which are the main part and the turn-up, the turn-up, subjected to the bending cycles, undergoes compressive deformations likely to lead to its fatigue failure and therefore to a reduction in the endurance of the bead and in the life of the tire.

Document EP 2 216 189 describes a tire bead the endurance of which is improved by reducing the compressive deformations in the turn-up when the bead flexes on the rim when in use. This objective is achieved by a turn-up which is such that the distance between the turn-up and the main part decreases continuously, radially towards the outside, from the bead wire, as far as a minimum distance and then increases continuously as far as a maximum distance. The turn-up extends radially on the inside of that point of the turn-up that corresponds to the maximum distance between the turn-up and the main part.

The bending cycles also lead to stresses and deformations mainly in shear and compression, in the polymer coating and filler materials, on the axially outer face of the turn-up because of the bending of the bead over the rim flange.

In particular, in the region in which the bead wraps over the rim flange, the bending cycles give rise to cracks in the axially outer face of the turn-up. These cracks spread through the polymer coating material and then into the polymer filler material in which they form cavities likely, over time, to lead to damage to the tire that entails the tire being replaced. The rate at which the cracks spread is dependent firstly on the amplitude and frequency of the stress and deformation cycles and secondly on the stiffnesses of the polymer materials in the cracks region.

Document JP 2004345414 has already described, in the case of a tire with a radial carcass reinforcement, beads the design of which is aimed at preventing cracks generated in the region of overlap between the turn-up and the radially outer end of a layer of metal reinforcing elements surrounding the radially inner part of the bead wire. In the technical solution proposed, an element made of polymer material is interposed between the turn-up and the radially outer end of the layer of metal reinforcing elements surrounding the radially inner part of the bead wire.

The inventors have set themselves the objective of increasing the endurance of the beads of a radial tire for a heavy vehicle of construction plant type by reducing the cracking that starts on the axially outer face of the turn-up and spreads through the polymer coating and filler materials.

SUMMARY

According to the invention, this objective has been achieved by:

a tire for a heavy vehicle of construction plant type comprising two beads intended to come into contact with a rim comprising two rim flanges which are at least partially circular, a carcass reinforcement comprising at least one carcass reinforcement layer made of metal reinforcing elements coated in a polymer coating material, the carcass reinforcement layer comprising a main part wrapped, within each bead, from the inside towards the outside of the tire, around a bead wire to form a turn-up, the distance between the turn-up and the main part decreasing continuously radially towards the outside, from the bead wire as far as a minimum distance, then increasing continuously as far as a maximum distance, each bead comprising a protection element extending a sidewall radially towards the inside, and a filler element axially on the inside of the protection element and of the sidewall and axially on the outside of the turn-up, the protection and filler elements being respectively made of at least one polymer protection material and one polymer filler material, the polymer filler material having an elastic modulus at 10% elongation that is lower than the elastic modulus at 10% elongation of the polymer coating material, a transition element, made of a polymer transition material, being in contact, via its axially inner face, with the polymer coating material of the axially outer face of the turn-up and, via its axially outer face, with the polymer filler material, and the elastic modulus at 10% elongation of the polymer transition material being somewhere between the respective elastic moduluses at 10% elongation of the polymer coating material and of the polymer filler material.

According to the invention, it is advantageous to have a transition element, made of a polymer transition material, in contact, via its axially inner face, with the polymer coating material of the axially outer face of the turn-up and, via its axially outer face, with the polymer filler material. This is because adding a transition element makes it possible to establish a stiffness gradient and to locally limit the levels of stress and deformation which govern the rate at which cracks starting on the axially outer face of the turn-up and spreading through the polymer coating and filler materials spread.

The elastic modulus at 10% elongation of the polymer transition material is advantageously somewhere between the respective elastic moduluses at 10% elongation of the polymer coating material and of the polymer filler material with which the transition element is in contact. The progressive decrease in the elastic moduluses at 10% elongation when making the successive transitions from the polymer coating material to the polymer transition material and then to the polymer filler material allows a decreasing and progressive stiffness gradient, making it possible to reduce the stresses and deformations on the axially outer face of the turn-up and, therefore, making it possible to slow the spread of cracks.

The greater the difference between the respective elastic moduluses at 10% elongation of the polymer coating material and of the polymer filler material, the more significant the advantage afforded by the elastic modulus at 10% elongation of the intermediate polymer transition material. In the example of the tire according to the invention studied, the elastic modulus at 10% elongation of the polymer coating material is equal to 1.6 times the elastic modulus at 10% elongation of the polymer filler material.

It is also advantageous for the radially outer end of the transition element to be radially on the outside of the straight line passing through the centre of the circle of the rim flange and making an angle of +70° with respect to the axial direction.

It is further advantageous for the radially inner end of the transition element to be radially on the inside of the straight line passing through the centre of the circle of the rim flange, and making an angle of +40° with respect to the axial direction.

With the rim of a tire comprising two rim flanges which are symmetric with respect to the equatorial plane of the tire and with each rim flange comprising in its radially outermost part a circular portion, there is defined, fore ach rim flange, a local frame of reference the origin of which is the centre of the circle of the rim flange and the axes of which are two straight lines passing through the centre of the circle of the rim flange and directed respectively axially towards the inside of the tire and radially towards the outside of the tire.

The angle of a straight line passing through the centre of the circle of the rim flange with respect to the axial direction is the angle of this straight line with the straight line of axial direction passing through the centre of the circle of the rim flange and directed towards the inside of the tire. This angle is positive if, when measured from the straight line that passes through the centre of the circle of the rim flange and oriented axially towards the inside of the tire to the said straight line, it involves a rotation in the anticlockwise direction.

The geometric positions of the ends of the transition element are measured on a tire mounted on its rim, i.e. inflated to its minimum pressure that correctly positions the beads of the tire with respect to the rim flanges. By way of example, this minimum pressure may be equal to 10% of the nominal inflation pressure as specified by the ETRTO standard.

The inventors have demonstrated that the region sensitive to cracking on the axially outer face of the carcass reinforcement turn-up lies between the straight lines passing through the centre of the circle of the rim flange and respectively making a minimum angle of +40° and a maximum angle of +70° with respect to the axial direction. This is in effect the region of greatest compression and greatest shear as the bead wraps over the rim flange under the load exerted on the tire. As a result, the transition element needs to at least cover this region of sensitivity to cracking on the axially outer face of the turn-up, taking into consideration tolerances on the positioning of the transition element with respect to the turn-up which tolerances are inherent to the method of manufacture.

According to one advantageous embodiment of the invention, the thickness of the transition element is at least equal to the thickness of the polymer coating material.

It is the constant thickness of the transition element measured away from the tapered regions at the ends of the transition element that is referred to as thickness.

What is referred to as the thickness of the polymer coating material is the thickness of the polymer coating material as measured, on the axially outer face of the turn-up, from and perpendicular to the axially outer generatrix of a metallic cylindrical reinforcing element of the turn-up.

This minimum thickness of the transition element makes it possible to establish a minimum stiffness gradient that allows the rate of spread of cracks to be decreased.

The thickness of the transition element is advantageously at most equal to 5 times the thickness of the polymer coating material. Specifically, the dissipation of heat of the polymer transition material is greater than that of the polymer filler material, because of its higher elastic modulus at 10% elongation. As a result, too great a volume of polymer transition material will lead to an increase in bead temperature that is detrimental to its life, hence the importance of placing a maximum limit value on the thickness of the transition element.

One advantageous embodiment of the invention is for the elastic modulus at 10% elongation of the polymer transition material to be at least equal to 0.9 times and at most equal to 1.1 times the arithmetic mean of the respective elastic moduluses at 10% elongation of the polymer coating material and of the polymer filler material. This range of values for the elastic modulus at 10% elongation of the polymer transition material guarantees a minimum stiffness gradient when making the successive transitions from the polymer coating material to the polymer transition material and then to the polymer filler material, and therefore guarantees a significant reduction in the rate at which the cracks spread.

Advantageously, the maximum distance between the turn-up and the main part is at least equal to 1.1 times the minimum distance between the turn-up and the main part. The result of this is that the filling element comprised axially between the turn-up and the main part, has a narrowing resulting in closeness between the turn-up and the main part allowing the turn-up not to be placed under compression when the tire is being driven on.

It is further advantageous for the distance from the point of the turn-up, positioned at the minimum distance axially on the outside of the main part to the reference line of the rim (known as the bead base line) to be at least equal to 1.25 times and at most equal to 2.5 times the distance from the radially outermost point of the rim to the reference line of the rim (known as the bead base line), and for the distance from the point of the turn-up, positioned at the maximum distance axially on the outside of the main part to the reference line of the rim (known as the bead base line) to be at least equal to two times and at most equal to four times the distance from the radially outermost point of the rim to the reference line of the rim (known as the bead base line). The reference line of the rim (known as the bead base line) usually, to a person skilled in the art, corresponds to the seat diameter. The distance from the radially outermost point of the rim to the reference line of the rim (known as the bead base line) defines the height of the rim flange. Radially positioning the points of the turn-up that are respectively closest and furthest away from the main part within these ranges of values optimizes tensions and guarantees that there will be no compression in the turn-up.

Advantageously and finally, with each bead comprising a filling element extending the bead wire radially outwards, the filling element being formed of at least two polymer filling materials, a first polymer filling material being radially further towards the inside and in contact with the bead wire, a second polymer filling material being radially on the outside of the first polymer filling material and having an elastic modulus at 10% elongation that is lower than the elastic modulus at 10% elongation of the first polymer filling material, a transition element, made of a polymer transition material is in contact, via its radially inner face with the first polymer filling material and is in contact via its radially outer face with the second polymer filling material and the elastic modulus at 10% elongation of the polymer transition material is somewhere between the respective elastic moduluses at 10% elongation of the first and second polymer filling materials. This transition element makes it possible to reduce the cracking that starts at the surface of contact between a first polymer filling material that is radially furthest towards the inside and in contact with the bead wire and a second polymer filling material that is radially on the outside of the first polymer filling material. This reduced cracking at the interface between the first and second polymer filling materials contributes to improving the endurance of the bead and increasing the life of the tire.

BRIEF DESCRIPTION OF THE FIGURES

The features of the invention will be better understood from the description of the attached FIGS. 1 and 2.

DETAILED DESCRIPTION OF SPECIFIC EMBODIMENTS

Figure 1:
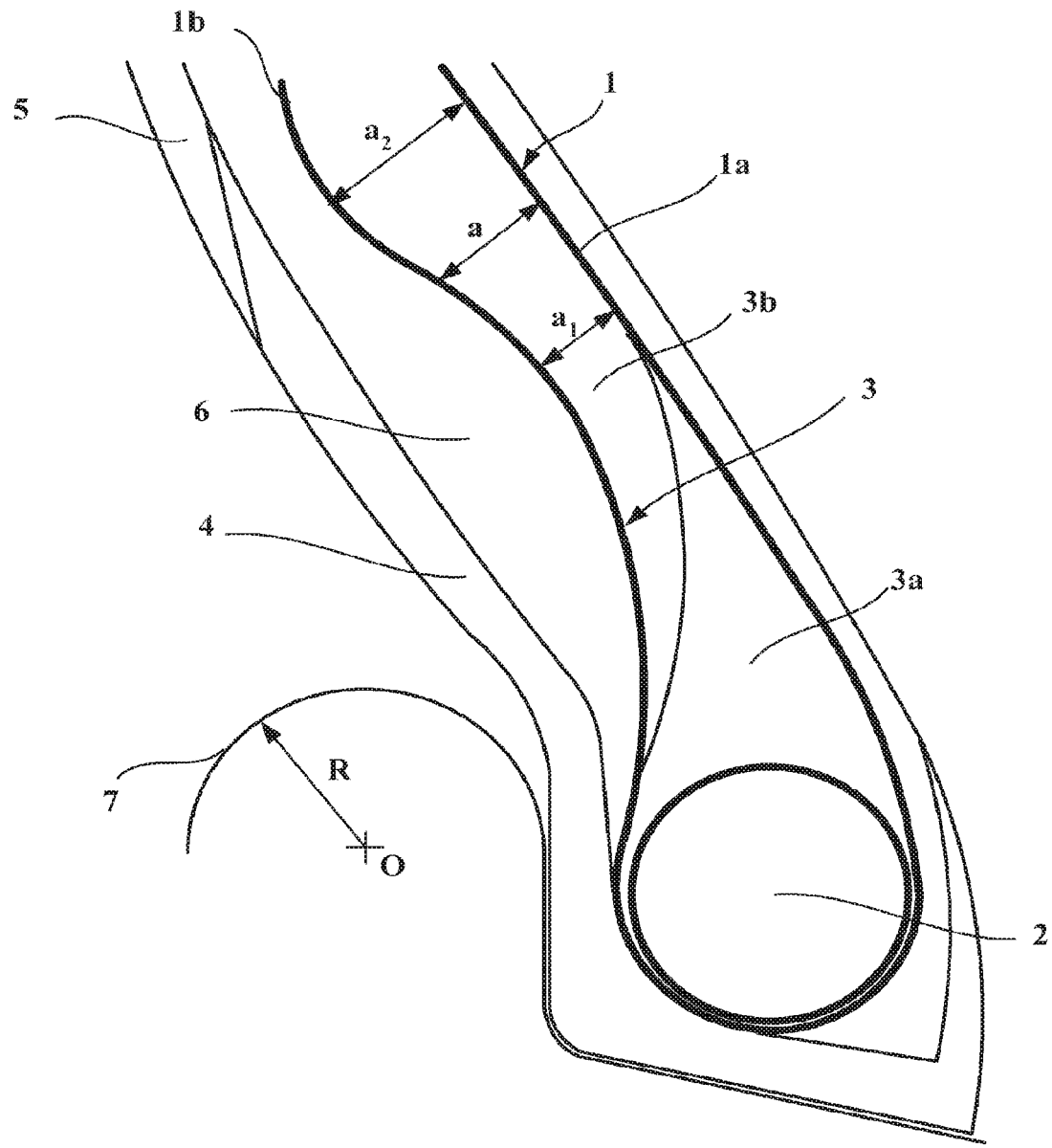
FIG. 1 is a view in section on a meridian plane of the bead of a tire for a heavy vehicle of the construction plant type, of the prior art.
Figure 2:
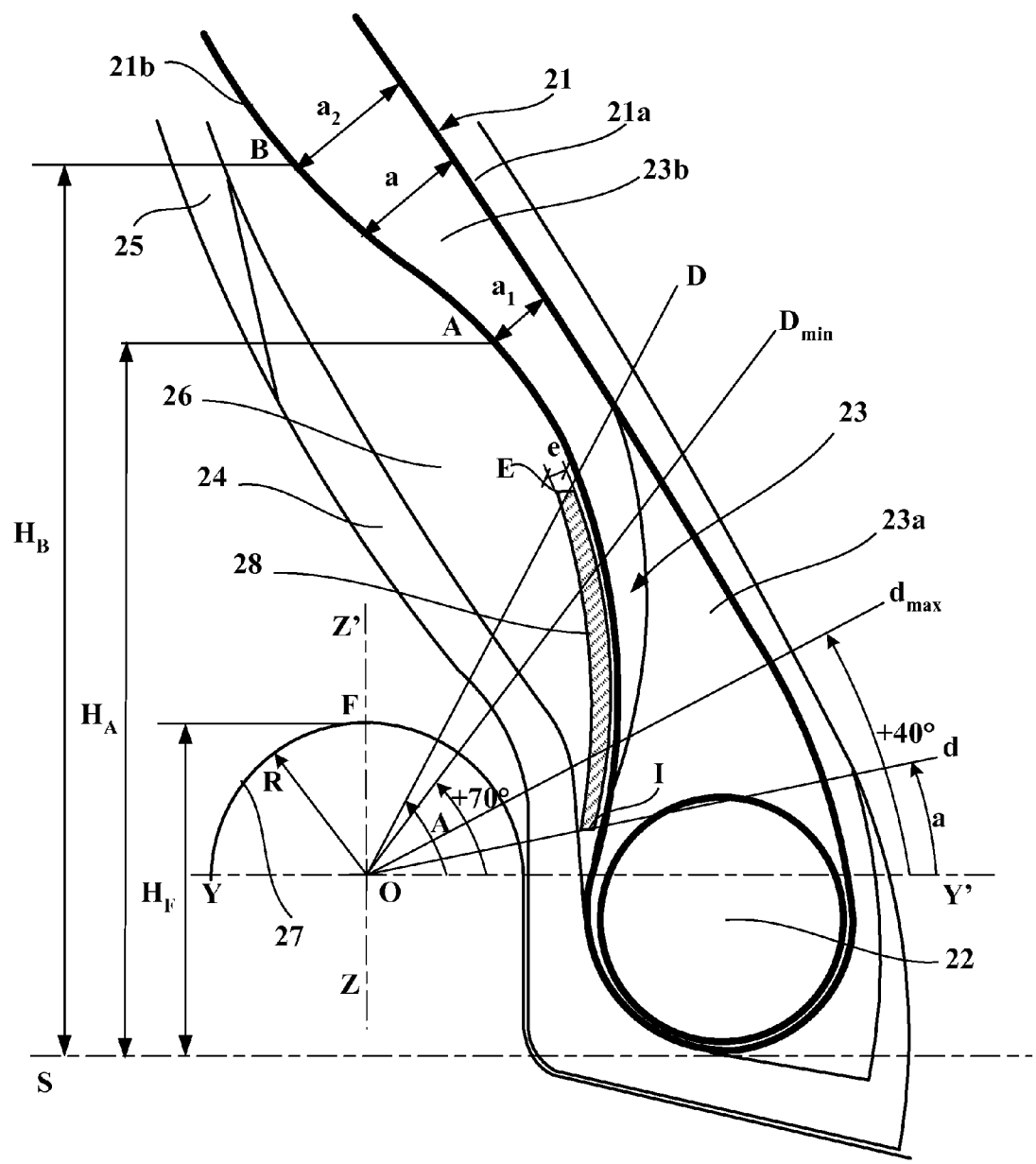
FIG. 2 is a view in section on a meridian plane of the bead of a Tire for a heavy vehicle of construction plant type, according to the invention.

In order to make them easier to understand, FIGS. 1 and 2 are not drawn to scale.

FIG. 1 depicts a bead of a tire for a heavy vehicle of the construction plant type of the prior art, comprising:

a carcass reinforcement comprising a single carcass reinforcement layer 1 made of metallic reinforcing elements coated in a polymer coating material with a main part 1*a* wrapped from the inside towards the outside of the tire, around a bead wire 2 to form a turn-up 1*b*, the distance a between the turn-up 1b and the main part 1a decreasing continuously, radially towards the outside, from the bead wire 2 as far as a minimum distance $a_1$, then increasing continuously as far as a maximum distance $a_2$, a filling element 3 extending the bead wire 2 radially outwards, and made of two polymer filling materials, a first polymer filling material 3a being radially on the outside of and in contact with the bead wire 2, a second polymer filling material 3b being radially on the outside of and in contact with the first polymer filling material 3a, a protection element 4 extending a sidewall 5 radially towards the inside and made of at least one polymer protection material, a filler element 6 axially on the inside of the protection element 4 and of the sidewall 5 and axially on the outside of the turn-up 1b, and made of a polymer filler material.

FIG. 2 shows a bead of a tire for a heavy vehicle of construction plant type, according to the invention, comprising:

a carcass reinforcement comprising a single carcass reinforcement layer 21 made of metallic reinforcing elements coated with a polymer coating material, with a main part 21a wrapped, from the inside towards the outside of the tire, around a bead wire 22 to form a turn-up 21b, the distance a between the turn-up 21b and the main part 21a decreasing continuously, radially towards the outside, from the bead wire 22 as far as a minimum distance $a_1$ then increasing continuously as far as a maximum distance $a_2$, a filling element 23 extending the bead wire 22 radially outwards and formed of two polymer filling materials, a first polymer filling material 23a being radially on the outside of and in contact with the bead wire 22, a second polymer filling material 23b being radially on the outside of and in contact with the first polymer filling material 23a, at protection element 24 extending a sidewall 25 radially towards the inside and consisting of at least one polymer protection material, a filler element 26 axially on the inside of the protection element 24 and of the sidewall 25 and axially on the outside of the turn-up 21b and made of a polymer filler material.

a transition element 28 in contact, via its axially inner face, with the polymer coating material of the axially outer face of the turn-up and, via its axially outer face, with the polymer filler material.

The geometry of the turn-up 21b is characterized by the point A of the turn-up 21b, which point is positioned at the minimum distance $a_1$, axially on the outside of the main part 21a and a distance $H_A$, radially on the outside of a reference line S of the rim 27, and by the point B of the turn-up 21b, which point is positioned at the maximum distance $a_2$ axially on the outside of the main part 21a and at a distance $H_B$ radially on the outside of a reference line S of the rim 27. The respective positions of the points A and B are defined with respect to the radially outermost point F of the rim 27 which point is positioned at a distance $H_F$, radially on the outside of a reference line S of the rim 27.

The transition element 28 has a thickness e schematically depicted as being constant but which in actual fact is usually tapered at the respectively radially outer E and radially inner I ends thereof.

Respective geometric positions of the radially outer E and radially inner I ends of the transition element 28 are defined with respect to the local frame of reference the origin of which is the centre O of the circle of the rim flange 27 and the axes YY' and ZZ' of which are two straight lines passing through the centre O of the circle of the rim flange and orientated respectively axially towards the inside of the tire and radially towards the outside of the tire. The angle of a straight line passing through the centre O of the circle of the rim flange is then positive if measured in the counterclockwise direction from the axis YY' to the straight line.

The radially outer E and radially inner I ends of the transition element 28 are situated respectively on the straight line D and d, making the angles A and a with the axis YY'.

The radially outer E and radially inner I ends of the transition element 28 are respectively radially on the outside of the straight line $D_{min}$, making an angle with respect to the axis YY' of +70°, and radially inside of the straight line $d_{max}$, making an angle with respect to the axis YY' of +40°. As shown in FIG. 2, the radially outer end E is also radially inside of the point A of the turn-up 21b.

The invention has been studied more particularly in the case of a tire for a heavy vehicle of the dumper type of size 59/80R63. According to the ETRTO standard, the nominal service conditions for such a tire are an inflation pressure of 6 bar, a static load of 99 tonnes and covering a distance of between 16 km and 32 km each hour.

The 59/80R63 tire was designed according to the invention, as depicted in FIG. 2.

As far as the geometry of the turn-up 21b is concerned, the point A of the turn-up 21b is positioned at the minimum distance $a_1$ equal to 18 mm, axially on the outside of the main part 21a, and at a distance $H_A$ equal to 200 mm, radially on the outside of a reference line S of the rim 27. The point B of the turn-up 21b is positioned at the maximum distance $a_2$ equal to 27 mm, axially on the outside of the main part 21a and at a distance $H_B$ equal to 390 mm, radially on the outside of a reference line S of the rim 27. The respective positions of the points A and B are defined with respect to the radially outermost point F of the rim 27, which point is positioned at a distance $H_F$ equal to 127 mm radially on the outside of a reference line S of the rim 27.

The angle A of the straight line D passing through the radially outer end E of the transition element 28 is equal to +80°, and is therefore greater than +70°.

The angle a of the straight line d passing through the radially inner end I of the transition element 28 is equal to +35°, and is therefore less than +40°.

The thickness e of the transition element 28 is equal to 1.5 mm, and is therefore somewhere between the thickness of the polymer coating material equal to 1 mm and 5 times the thickness of the polymer coating material.

The elastic moduluses at 10% elongation of the polymer coating, transition and filler materials are respectively equal to 6 MPa, 4.8 MPa and 3.5 MPa. As a result, the elastic modulus at 10% elongation of the polymer transition material is equal to the arithmetic mean of the respective elastic moduluses at 10% elongation of the polymer coating and filler materials.

Simulations of finite-element calculations were carried out respectively on a reference tire, as depicted in FIG. 1, and on a tire according to the invention, as depicted in FIG. 2. For the reference tire, the elongation of the polymer filler material 6, in the region sensitive to cracking on the axially outer face of the turn-up 1b, is equal to 1.3 times the elongation of the polymer coating material in contact with it, these elongations being parallel to the turn-up. For the tire according to the invention, the elongation of the polymer transition material 28, in the region sensitive to cracking on the axially outer face of the turn-up 21b, is equal to 1.1 times the elongation of the polymer coating material. As a result, the rate at which a crack in the polymer coating material spreads to the polymer transition material 28, in the case of the invention, is lower than the rate at which a crack in the polymer coating material spreads to the polymer filler material 6 in the case of the reference tire, because the ratio of the elongation of the polymer transition material 28 with respect to the elongation of the polymer coating material, equal to 1.1, is lower than the ratio of the elongation of the polymer filler material 6 with respect to the elongation of the polymer coating material, equal to 1.3.

The invention should not be interpreted as being restricted to the example illustrated in FIG. 2, but may be extended to other alternative forms of embodiment, for example and nonlimitingly, relating to the number of polymer transition materials comprised between the polymer coating material and the polymer filler material.

The invention claimed is:

1. A tire for a heavy vehicle of construction plant type mounted on a rim comprising two rim flanges which are at least partially circular, the tire comprising: two beads contacting the rim, a carcass reinforcement comprising a carcass reinforcement layer made of metal reinforcing elements coated in a polymer coating material, the carcass reinforcement layer comprising a main part wrapped, within each bead, from the inside towards the outside of the tire, around a bead wire to form a turn-up, the distance (a) between the turn-up and the main part decreasing continuously radially towards the outside, from a bead wire as far as a minimum distance ($a_1$), then increasing continuously as far as a maximum distance ($a_2$), each bead comprising a protection element extending a sidewall radially towards the inside, and a filler element axially on the inside of the protection element and of the sidewall and axially on the outside of the turn-up, the protection and filler elements being respectively made of at least one polymer protection material and one polymer filler material, the polymer filler material having an elastic modulus at 10% elongation that is lower than the elastic modulus at 10% elongation of the polymer coating material, wherein a transition element, made of a polymer transition material, is in contact, via its axially inner face, with the polymer coating material of the axially outer face of the turn-up via its axially outer face, with the polymer filler material, and wherein the elastic modulus at 10% elongation of the polymer transition material is somewhere between the respective elastic moduli at 10% elongation of the polymer coating material and of the polymer filler material,
wherein the radially outer end (E) of the transition element is radially on the outside of the straight line (Dmin) passing through the centre (O) of the circle of the rim flange and making an angle of +70° with respect to the axial direction (YY'), and the radially outer end (E) of the transition element is radially on the inside of a point A of the turn-up, the point A being positioned at the minimum distance ($a_1$) between the turn-up and the main part.

2. The tire for a heavy vehicle of construction plant type according to claim 1, mounted on the rim, wherein a radially inner end (I) of the transition element is radially on the inside of a straight line (dmax) passing through a centre (O) of a circle of the rim flange, and making an angle of +40° with respect to an axial direction (YY').

3. The tire for a heavy vehicle of construction plant type according to claim 1, mounted on the rim, wherein a thickness (e) of the transition element is at least equal to a thickness of the polymer coating material.

4. The tire for a heavy vehicle of construction plant type according to claim 1, mounted on the rim, wherein a thickness (e) of the transition element is at most equal to 5 times a thickness of the polymer coating material.

5. The tire for a heavy vehicle of construction plant type according to claim 1, mounted on the rim, wherein the elastic modulus at 10% elongation of the polymer transition material is at least equal to 0.9 times and at most equal to 1.1 times the arithmetic mean of the respective elastic moduli at 10% elongation of the polymer coating material and of the polymer filler material.

6. The tire for a heavy vehicle of construction plant type according to claim 1, mounted on the rim, wherein the maximum distance ($a_2$) between the turn-up and the main part is at least equal to 1.1 times the minimum distance ($a_1$) between the turn-up and the main part.

7. The tire for a heavy vehicle of construction plant type according to claim 1, mounted on the rim and comprising a point A of the turn-up, which point is positioned at the minimum distance ($a_1$), axially on the outside of the main part and at a distance ($H_A$), radially on the outside of a reference line (S) of the rim, a radially outermost point F of the rim being positioned at a distance ($H_F$), radially on the outside of a reference line (S) of the rim, wherein the distance ($H_A$) from the point A of the turn-up, positioned at the minimum distance ($a_1$) axially on the outside of the main part to the reference line (S) of the rim is at least equal to 1.25 times and at most equal to 2.5 times the distance ($H_F$) from the radially outermost point F of the rim to the reference line (S) of the rim, wherein S is the bead base line.

8. The tire for a heavy vehicle of construction plant type according to claim 1, mounted on the rim and comprising a point B of the turn-up which point is positioned at the maximum distance ($a_2$), axially on the outside of the main part at a distance ($H_B$), radially on the outside of a reference line (S) of the rim, a radially outermost point F of the rim being positioned at a distance ($H_F$), radially on the outside of a reference line (S) of the rim, wherein the distance ($H_B$) the point B of the turn-up, positioned at the maximum distance ($a_2$) axially on e outside of the main part to the reference line (S) of the rim is at least equal to two times and at most equal to four times the distance ($H_F$) from the radially outermost point F of the rim to the reference line (S) of the rim, wherein S is the bead base line.

* * * * *